(12) United States Patent
Masters et al.

(10) Patent No.: US 6,535,147 B1
(45) Date of Patent: Mar. 18, 2003

(54) SEGMENTED GAIN CONTROLLER

(75) Inventors: Tim Masters, Georgetown, TX (US);
Joel Kent, Fremont, CA (US)

(73) Assignee: The Whitaker Corporation, Wilmington, DE (US)

(*) Notice: Subject to any disclaimer, the term of this patent is extended or adjusted under 35 U.S.C. 154(b) by 0 days.

(21) Appl. No.: 09/440,991

(22) Filed: Nov. 16, 1999

Related U.S. Application Data (63) Continuation-in-part of application No. 09/192,980, filed on Nov. 16, 1998, now abandoned.

(51) Int. Cl.[7] ........................ H03M 11/00; H03K 17/94
(52) U.S. Cl. ........................ 341/34; 345/177; 178/18.04
(58) Field of Search ........................ 341/34; 178/18.04; 345/177

(56) References Cited

U.S. PATENT DOCUMENTS

| | | | |
|---|---|---|---|
| 3,916,099 A | 10/1975 | Hlady | 178/18 |
| 5,260,521 A | 11/1993 | Knowles | 178/18 |
| 5,329,070 A | 7/1994 | Knowles | 178/18 |
| 5,334,805 A | 8/1994 | Knowles et al. | 178/18 |

*Primary Examiner*—Timothy Edwards (57) ABSTRACT

A touch screen includes a transmitter capable of delivering an acoustic signal to the touch screen and a receiver adapted to detect acoustic signals on the touch screen and deliver a first signal representative of the detected acoustic signals. An automatic gain control amplifier has an input, output, and control terminal, and is adapted to receive the first signal on the input terminal and deliver an amplified version of the first signal on the output terminal. The control terminal is adapted to receive a control signal that varies the gain of the amplifier. An analog to digital converter is adapted to receive the amplified first signal and deliver a digital representation thereof. A first circuit is adapted to receive one of the amplified first signal and the digital signal, determine the difference between the received signal and a preselected value, and deliver a control signal to the control input of the amplifier. The control signal has a magnitude responsive to the determined difference.

5 Claims, 9 Drawing Sheets

FIG. 9

SEGMENTED GAIN CONTROLLER

This application is a Continuation-In-Part of application Ser. No. 09/192,980 filed Nov. 16, 1998, now abandoned.

BACKGROUND OF THE INVENTION

1. Field of the Invention

This invention relates in general to digital systems, and, more particularly, to touch screens used with digital systems.

2. Description of the Related Art

The usability of highly complex digital systems has been greatly simplified by the development of intuitive interfaces. Devices, such as touch screens, have helped to make it possible to utilize even the most complex digital systems by relatively untrained users. Touch screens have found application in a wide variety of complex systems, such as automatic teller machines, general purpose computers, manufacturing equipment, cash registers, etc.

Several technologies have been used to construct touch screens, such as, infrared transducers, ultrasonic transducers, and acoustic sensors. The acoustic transducers generate acoustic waves, for example, Rayleigh waves, shear waves, e.g., zeroth order horizontally polarized shear waves, or any other acoustic mode sensitive to touch. Acoustic sensor technology generally involves a plate, for example a glass plate that is exposed to an acoustic wave on either its surface (Rayleigh waves) or internal to the late (shear waves). When the plate is touched, some of the energy in the acoustic wave is absorbed, which can be detected and attributed to a particular location on the plate. Thus, the presence and location of a touch may be identified.

Both types of acoustic sensors have shown much promise, but both also have known shortcomings. For example, in Rayleigh wave technology the acoustic wave travels on the surface of the plate, and therefore, is greatly affected by an object touching the surface of the glass plate. Thus, even relatively light touches produce a substantial change in the Rayleigh wave, and may be readily detected. However, since the acoustic wave travels on the exposed surface it is also susceptible to environmental factors, such as dirt, dust, oils, water, etc. Accordingly, the use of Rayleigh wave technology may be limited to less severe environments, and may require frequent cleaning to insure proper operation.

In shear wave technology, on the other hand, since the acoustic wave travels within the glass plate, environmental factors have less impact on the ability of the system to detect touches. That is, dirt on the glass plate does not materially affect its operation. However, because the acoustic wave is within the glass plate, light touches have little impact on the acoustic wave, and, thus, are more difficult to detect. Substantially more pressure must be applied to a shear wave technology touch screen for a touch to be registered.

The present invention is directed to overcoming, or at least reducing the effects of, one or more of the problems set forth above.

SUMMARY OF THE INVENTION

In one embodiment of the present invention, a controller is provided to coordinate the operation of a touch screen. The controller includes at least an adjustable gain amplifier, and a control circuit. The adjustable gain amplifier has an input, an output, and a gain control terminal, and receives a first signal representative of an acoustic signal on a touch screen on the input terminal and delivers an amplified version of the first signal on the output terminal. The gain control terminal receives a control signal that varies the gain of the amplifier. The control circuit may include an analog to digital converter (ADC). The ADC receives at least a portion of the amplified first signal and outputs a digital signal (value) representative thereof. The control circuit may also include a processing element. The processing element is electrically coupled to the ADC and receives the digital signal. The processing element compares the digital signal to a preslected value and determines the difference if any between the digital signal and the preselected value. If the difference exceeds a preselected limit, the control circuit delivers a control signal to the control input of the amplifier. The control signal has a magnitude responsive to the determined difference.

Another aspect of the present invention provides a method for controlling the operation of a touch screen. An acoustic signal is delivered to the touch screen. The presence of the acoustic signal at the touch screen is detected and a first electrical signal responsive thereto is delivered. The first electrical signal is amplified by a preselected gain, and the amplified signal is digitized. Thereafter, a difference between the magnitude of the digitized amplified signal and a reference signal is determined, and the gain is varied in response to the difference.

In yet another embodiment of the present invention, a controller is provided to control the operation of a touch sensor system based upon predetermined parameters. This embodiment includes an adjustable gain amplifier and a control circuit. The adjustable gain amplifier has an input, an output, and a gain control terminal, and receives a first signal representative of an acoustic signal on a touch screen on the input terminal and delivers an amplified version of the first signal on the output terminal. The gain control terminal receives a control signal that varies the gain of the amplifier.

The control circuit includes at least a processing element and a memory element. The memory element stores data defining when the gain of the amplifier must be adjusted to compensate for variations in the manufacturing process of the touch screen used in the touch sensor system. Based upon this data, the processing element sends a gain control signal to the amplifier.

BRIEF DESCRIPTION OF THE DRAWINGS

The invention may be best understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Detailed Description of Specific Embodiments

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Overview

Figure 1:
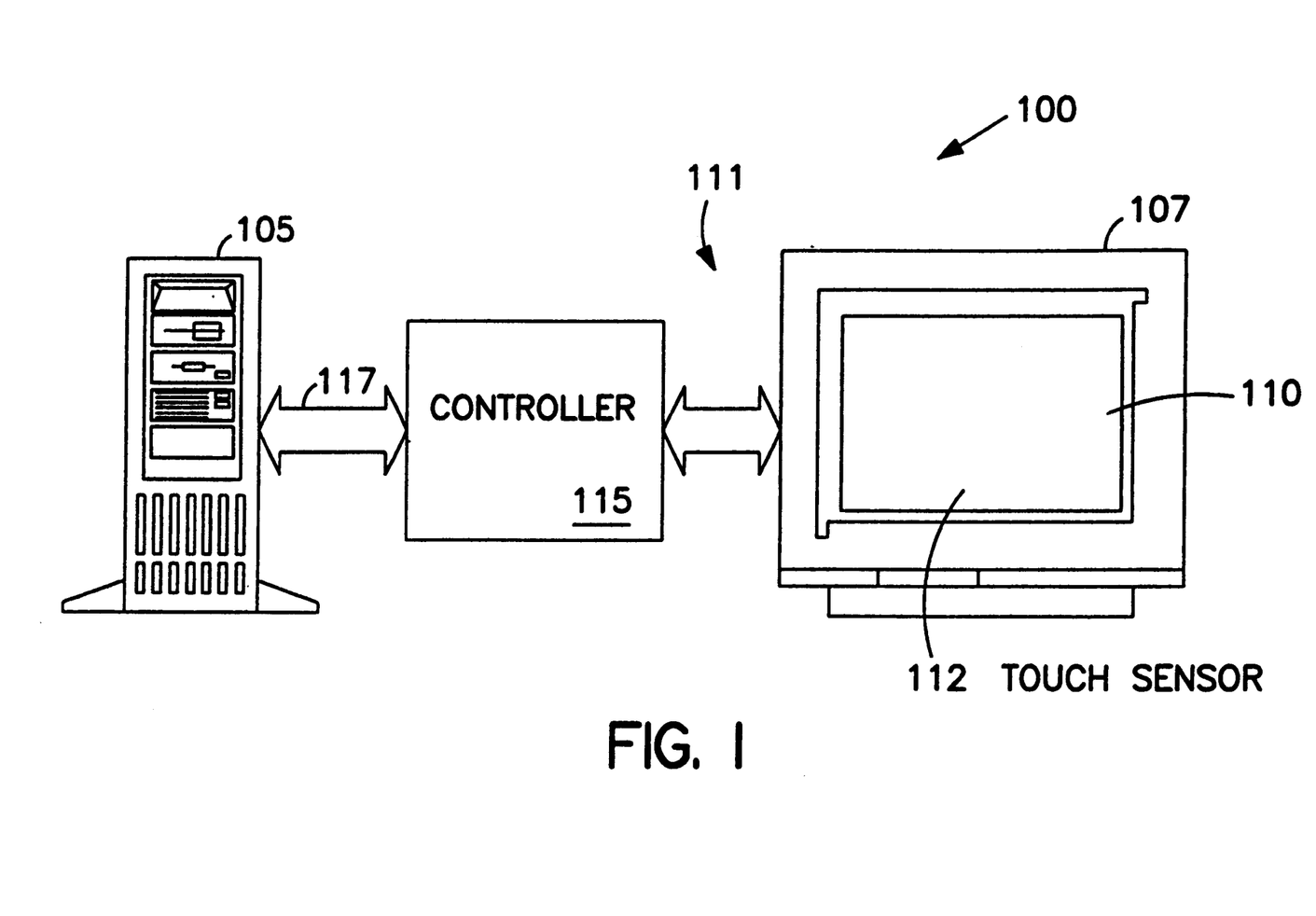
FIG. 1 is a top-level block diagram for a computer system that includes a controller according to the present invention.

FIG. 1 illustrates a computer system 100 that includes a host computer 105 and a touch-display monitor 107 capable of both displaying information and detecting touches by a user. The host computer 105 may include a microprocessor (not shown) that may be designed to control the computer system 100. The monitor 107 may be used to display images generated by the host computer 105 on a screen 110. A touch system 111 includes a controller 115 and a touch sensor 112 overlying the screen 110. The controller 115 serves as an interface between the host computer 105 and the touch sensor 112. The controller 115 may be physically located in the computer 105, the monitor 107, or in a stand-alone unit (not shown), and is electrically coupled to the touch sensor 112, such that the controller 115 identifies touches to the touch sensor 112. When the controller 115 detects a touch, a signal is generated by the controller 115 and routed to the host computer 105 by the line 117. In this manner, the computer system 100 may identify a touch to the touch sensor 112 of the monitor 107.

Specific Embodiments

Figure 2:
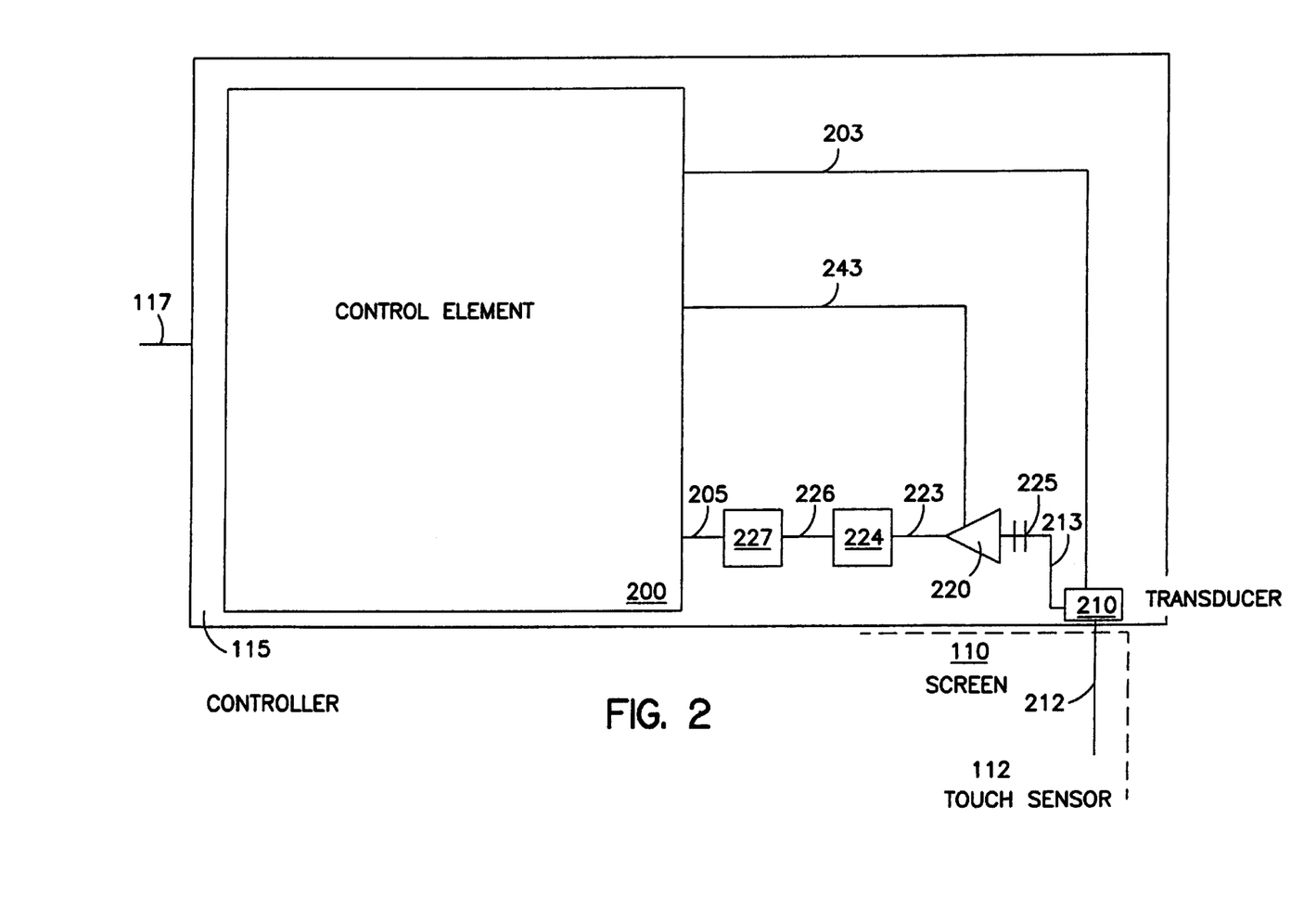
FIG. 2 is a more detailed block diagram of an embodiment of the controller of FIG. 1.

FIG. 2 is a more detailed block diagram of one embodiment of the controller 115. As previously mentioned, the controller 115 is coupled to the host computer 105 (see FIG. 1) by the line 117. The controller 115 includes a control circuit 200. The control circuit 200 is coupled to an acoustic signal component 210 via a control signal line 203. The acoustic signal component 210 may include, for example, an acoustic signal generator/transmitter and an acoustic signal receiver. Alternatively, the acoustic signal component 200 may include a single element for transmitting and receiving the acoustic signal, i.e. a transducer. The control circuit outputs a control signal on the control line 203 that directs the generation of an acoustic signal by the acoustic signal component 210. The control circuit 200 also receives a signal representing touch information via an input line 205. The acoustic signal component generates an acoustic signal in response to a control signal on the line 203.

Because the transducer 210 is positioned proximate to the touch sensor 112, the generated acoustic signals cause the touch sensor 112 to vibrate along a first axis 212. This vibration causes acoustic signals to traverse the touch sensor 112 and reflect off of the opposite edge, producing an echo, which has a pattern that may reflect the presence of a touch to the touch sensor 112. When the transducer 210 receives the echo signal, it produces a corresponding electrical signal on a output line 213. An adjustable gain amplifier 220 receives the electrical signal applied to the line 213 via an AC coupling capacitor 225. The gain of the amplifier 220 may be varied via a control input coupled to the control circuit 200 via a control line 243. The signal on the control line 243 may be used to dynamically adjust the gain of the amplifier 220 to keep its output signal in a linear region of an analog-to-digital (A/D) converter within the control circuit 200. One skilled in the art will appreciate that the amplitude of the signal applied to the output line 213 may vary, depending upon sensor size, process variations, and environmental effects. The AGC amplifier 220 is controlled by the control circuit 200 to maintain these fluctuations within a desired linear range by dynamically varying the gain.

Figure 7A:
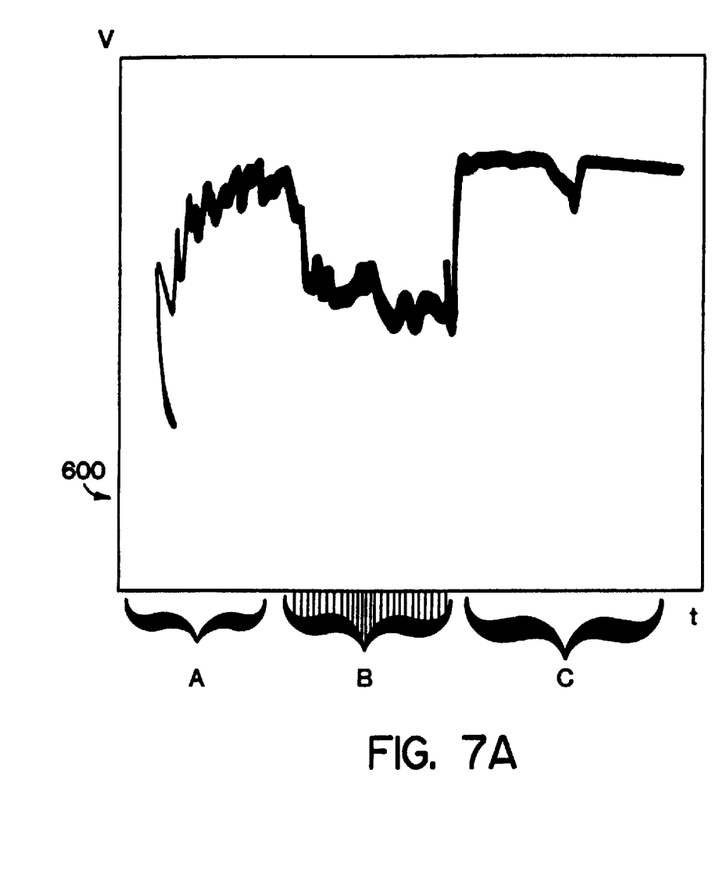
FIGS. 7A and 7B illustrate waveforms of a demodulated acoustic signal of the controller.
Figure 7B:
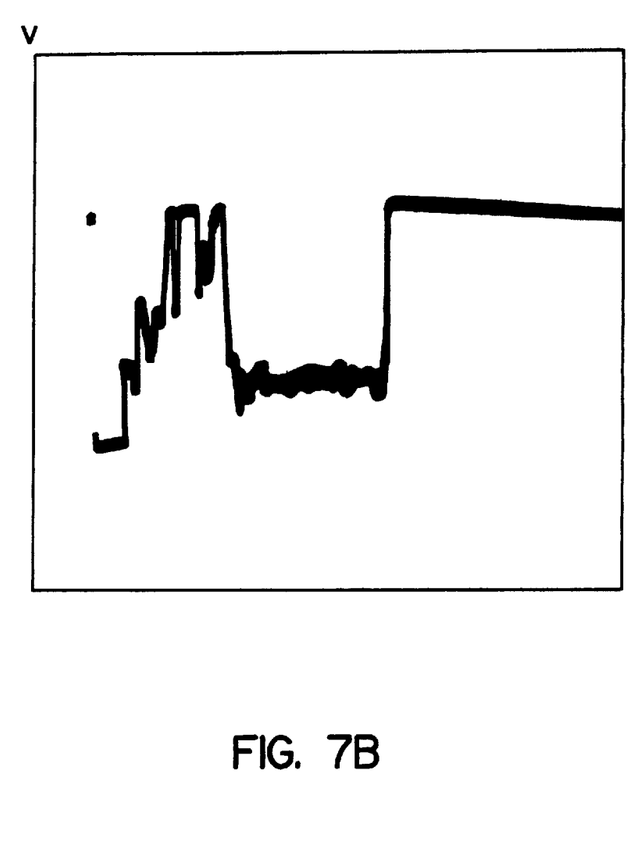

The waveform diagrams of FIGS. 7A and 7B show stylized representations of the output of the amplifier 220 without the adjustable gain feature and with the adjustable gain feature, respectively. That is, FIG. 7A shows the output of an amplifier 220 that does not have its gain varied dynamically, but rather applies a constant gain throughout. The waveforms may be segmented into three general regions of interest. In the first segment A, the transducer 210 produces an acoustic burst that travels through the touch sensor 112. In the illustrated embodiment, the acoustic burst is about 35 cycles of a 5 MHz signal, which in the waveform corresponds to the short negative going portion 600 at the beginning of segment A. The remainder of segment A represents noise and the travel time of the acoustic signal through the touch sensor 112. In the second segment B, the transducer 210 responds to the returned acoustic energy. That is, the transducer 210 switches to a receive mode and produces an electrical signal that corresponds to the reflected burst signal. In the third segment C, substantially all of the acoustic energy has dissipated and no useful information regarding a touching of the touch sensor 112 is present. The control circuit 200 varies the gain of the amplifier 220 only in response to the magnitude of the signal in the segment B.

A band pass filter 224 is coupled to the amplifier 220 by a line 223 to remove any unwanted frequencies from the associated signal. One skilled in the art will appreciate that electrical and acoustic noise may generate additional unwanted frequencies. Though the specific type of band pass filter 224 may vary depending on design interests, the band pass filter 224 outputs a signal applied to a line 226 that is sent to a demodulator 227. The demodulator 227 strips off the 5 MHz carrier signal to leave an analog DC (direct current) signal that is proportional to the amplitude of the signal delivered by the bandpass filter 224. The analog signal is delivered to the control circuit 200 where it is analyzed to determine if a touch has occurred. The analog signal is also processed to provide the appropriate feedback to the amplifier 220 to dynamically maintain its output in a desired range.

Figure 3:
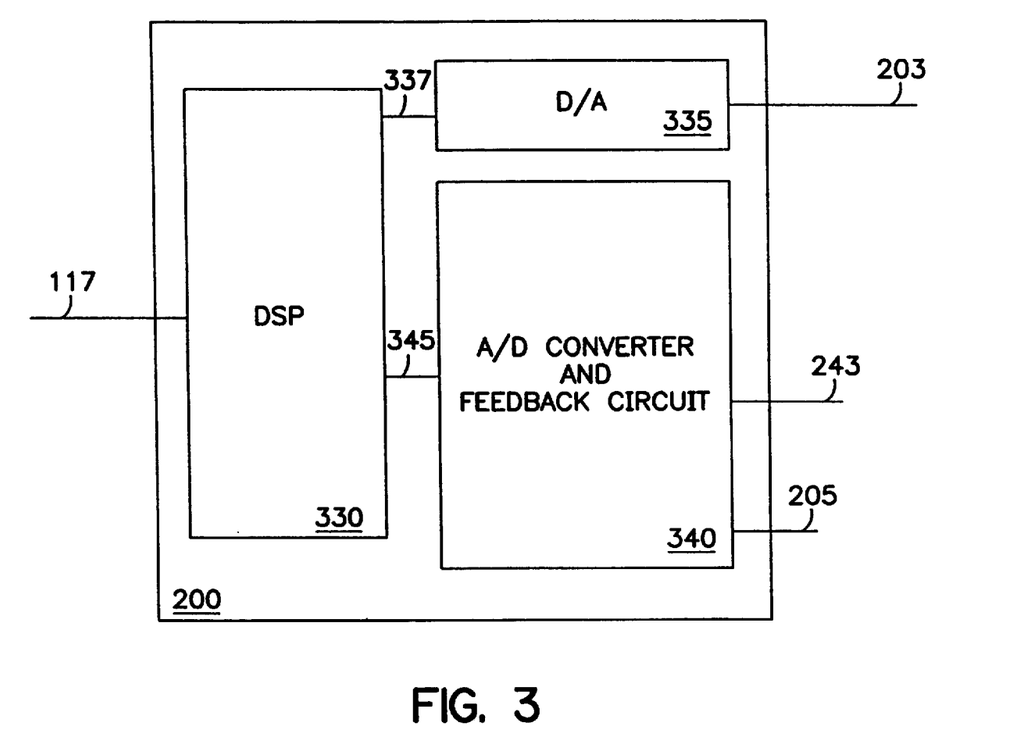
FIG. 3 is a more detailed block diagram of an embodiment of a logic circuit of FIG. 2.

FIG. 3 illustrates a more detailed block diagram of an embodiment of the control circuit 200 and its interface circuitry shown in FIG. 2. The control circuit 200 is shown to be constructed from an ASIC 330 (application specific integrated circuit). One skilled in the art will appreciate that the ASIC 330 may be programmed to perform a variety of functions, such as digital signal processing (DSP). A digitalto-analog circuit (D/A) 335 is coupled to the DSP 330 by a line 337 and to the transducer 210 by the line 203. The D/A 335 converts a digital signal received from the DSP 330 to an analog signal. The analog signal is applied to the line 203. As previously mentioned, the transducer 210 generates acoustic waves, which traverse the touch sensor 112 in response to receiving the analog signal applied to the line 203.

An A/D converter and feedback circuit 340 converts the analog signal to a digital signal and forwards the digital signal to the DSP 330 over a line 345. As discussed above, the DSP 330 analyzes the digital signal to determine if a touch has occurred. The feedback portion of the logic circuit 340 also analyzes the amplitude of the received analog signal to determine if it is within the linear region of the A/D converter. If the amplitude is too large, the feedback circuit delivers a signal over the line 243 to reduce the gain of the amplifier 220. Alternatively, if the amplitude is too small, the feedback circuit increases the gain of the amplifier 220. These adjustments to the gain of the amplifier 220 may occur numerous times during segment B of the waveform of FIG. 7B.

Figure 4:
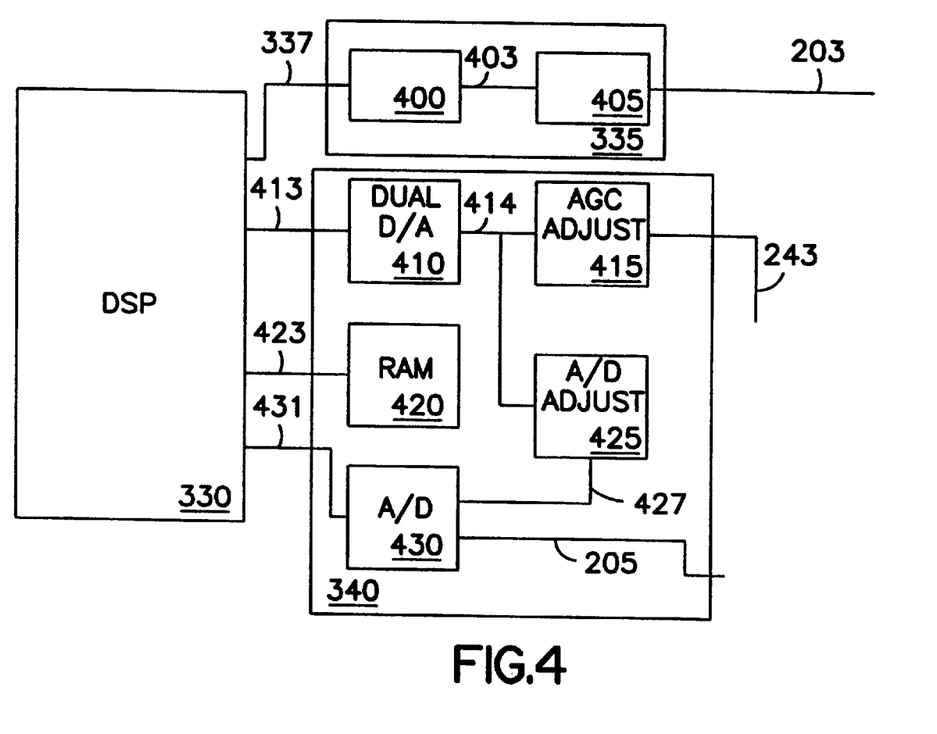
FIG. 4 is a more detailed diagram of the logic circuit of FIGS. 2 and 3.

FIG. 4 is a more detailed block diagram of the D/A circuit 335 and the converter and feedback circuit 340 of the control circuit 200 of FIG. 3. The D/A circuit 335 is shown to include logic circuits 400 and 405. The logic circuit 400 is coupled to the DSP 330 by the line 337. The digital signal that the DSP 330 applies to the line 337 is received by the logic circuit 400, which converts the signal applied to the line 337 from a first voltage (e.g., about 5 volts) to a second voltage (e.g., about 10 volts). The logic circuit 400 is coupled to the logic circuit 405 by a line 403. When the logic circuit 400 applies a digital signal to the line 403, the logic circuit 405 converts that digital signal to an analog signal at a third voltage (e.g., about 200 volts peak-to-peak) and applies it to the line 203. In this manner, the digital signal generated by the DSP 330 at the first voltage (e.g., about 5 volts) is converted to an analog signal that is applied to the line 203 at a third voltage (e.g., about 200 volts), which is sufficient to drive the transducer 210 to produce an acoustic wave of sufficient magnitude for proper operation of the controller 115.

The converter and feedback circuit 340 is shown to include a dual D/A converter 410, a gain adjust circuit 415, a RAM 420, an A/D adjust circuit 425, and an A/D circuit 430. The analog signal on the line 205 is delivered to the A/D circuit 430, which converts it to a digital signal and delivers it to the DSP 330 over a line 431. As discussed above, the DSP 330 analyzes the digital signal to determine both touch information and to ensure that the analog signal is within the linear range of the A/D circuit 430. In the event that the DSP 330 determines that the analog signal has exceeded the linear range of the A/D circuit 430, then a digital signal is delivered over a line 413 to the dual D/A circuit 410, which converts the digital signal to an analog signal and delivers it to the gain adjust circuit 415. The adjust circuit 415 varies the analog signal delivered over the line 243 to the control input of the amplifier 220. The control signal delivered from the adjust circuit 415 operates to reduce/increase the gain of the amplifier 220 as determined by the DSP 330.

The signal applied to the line 414 is also sent to the A/D reference adjust circuit 425. The A/D adjust circuit 425 generates a reference signal that is delivered to a control input of the A/D circuit 430 to control the window of voltages that the A/D circuit 430 will convert. That is, reducing the size of the A/D window has the effect of increasing sensitivity. For example, a 12-bit A/D circuit operating on a voltage range of 0 to 1 volt is capable of dividing the 0 to 1 volt range into 4,048 intervals separated by approximately 0.25 millivolts. However, reducing the voltage range to 0 to 0.8 means that the voltage range can now be expressed as 4,048 intervals separated by approximately 0.2 millivolt intervals. Thus, the A/D circuit 430 can more accurately represent the voltages experienced by it in a narrower range of operation.

Figure 5:
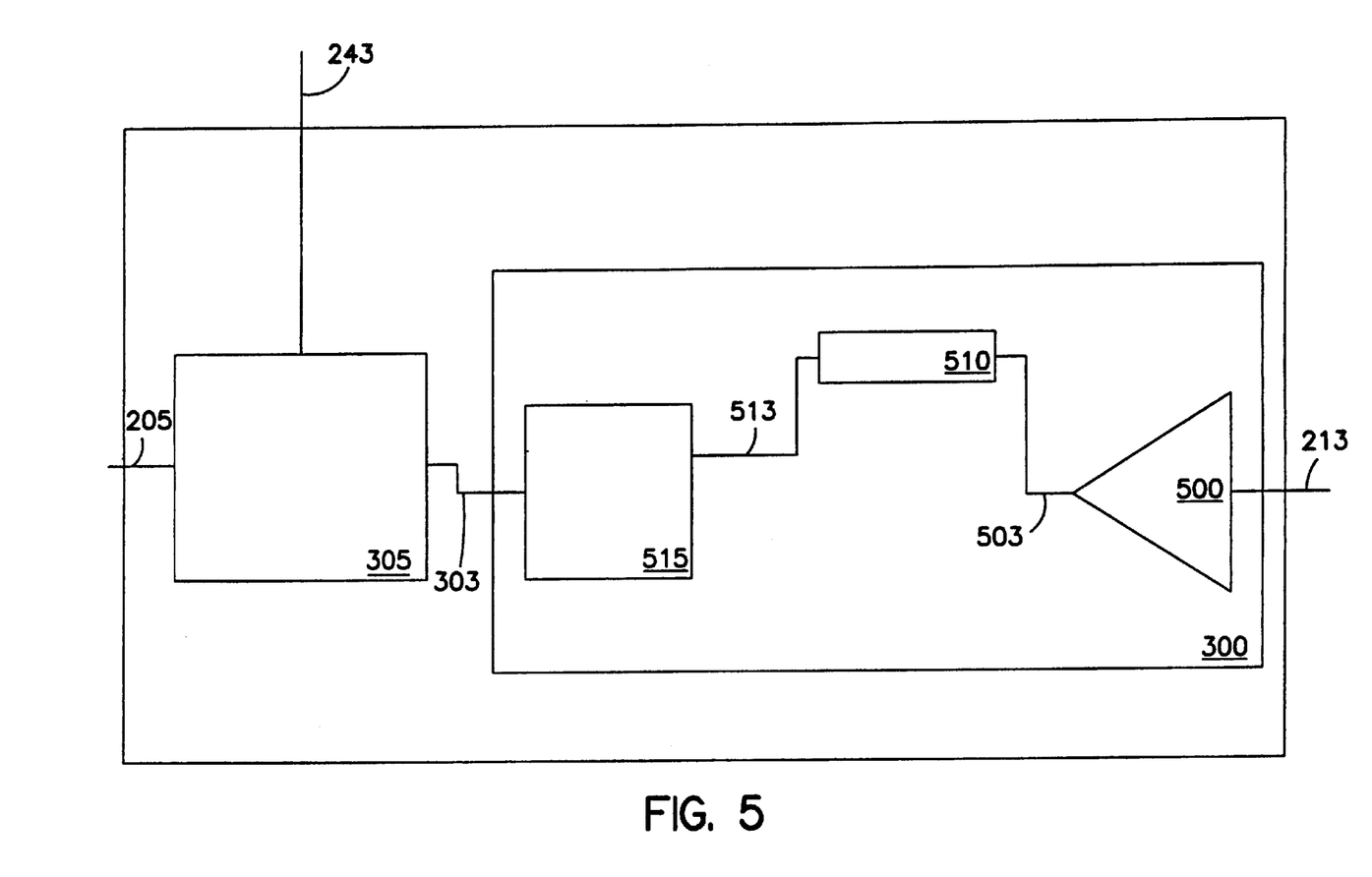
FIG. 5 is a block diagram of an alternative embodiment of a portion of the controller of FIG. 1.

FIG. 5 is a block diagram for an alternative embodiment of the AGC amplifier 220, bandpass filter 224, and demodulator 227 of FIG. 2. A linear circuit 300 is shown to include an amplifier 500, a band pass filter 510, and a demodulator 515. The amplifier 500 amplifies the echo signal received on the line 213 from the screen 110 and applies it to a line 503. The band pass filter 510 removes unwanted frequencies from the signal applied to the line 503 and applies the filtered signal to the demodulator 515 over a line 513. One skilled in the art will appreciate that touching the sensor 112 causes an additional acoustic signal to be superimposed on the echoed carrier signal resulting from the acoustic burst generated on the line 203. The demodulator 515 removes the carrier signal and applies a logarithmic signal to the line 303, which allows the signal applied to the line 303 to change very little in response to fluctuations of the signal applied to the line 213. The AGC circuit 305 conditions the signal on the line 303.

Figure 6:
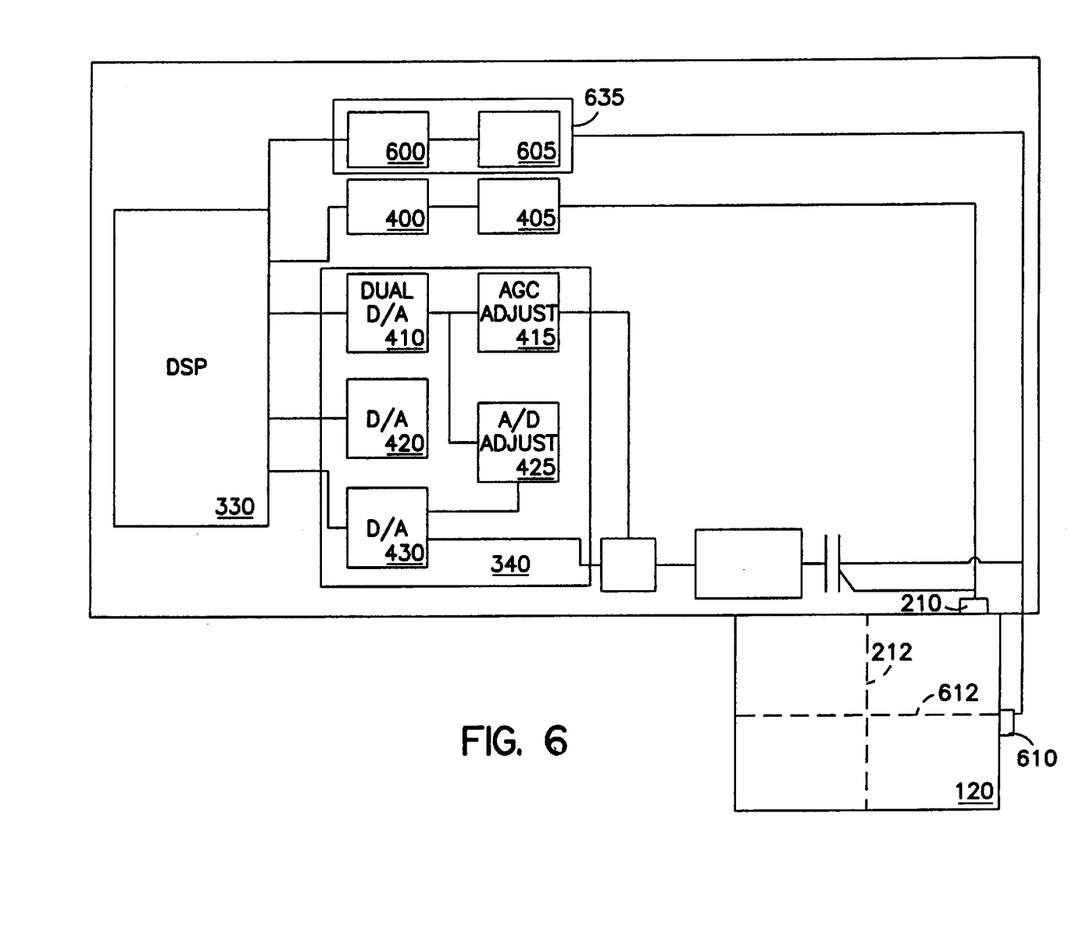
FIG. 6 is an alternate embodiment of the controller of FIG. 1.

FIG. 6 is an alternative embodiment of the controller 115 of the present invention. In this embodiment, the controller 115 is shown to include two transducers 210, 610. The transducer 610 is designed to function similarly to the transducer 210. As previously discussed, the transducer 210 causes the sensor 120 to vibrate along a first axis 212. The transducer 610 is designed to cause the sensor 120 to vibrate along a second axis 612. By using the transducers 210, 610 the controller 115 may accurately determine the location of a touch. The transducer 610 is controlled by a translation circuit 635, which is coupled to the ASIC 330. The translation circuit 635 is shown to include a digital translation circuit 600 and an analog translation circuit 604, which behave similarly to the digital translation circuit 400 and the analog translation circuit 405.

In an alternative embodiment, the present invention may be used to compensate for signal amplitude variations caused by variations in the manufacturing process of the touch screen. Specifically, the properties of the plate of the touch screen, through which the acoustic signal is transmitted and received, may vary based upon the manufacturing process and/or materials used to produce the plate. For example, if the plate is glass, the raw material used to make the plate may originate from different sources from batch to batch. As such, the acoustic properties will change from batch to batch, but remain more or less the same within a particular batch. In order to take advantage of the consistencies within a batch and the distinctions between batches, the acoustic properties of a particular batch and the characteristics of signals transmitted and received through the plate are analyzed. The analysis enables a controller to know how a plate will respond to or alter an acoustic signal and compensate for those changes automatically.

Figure 8:
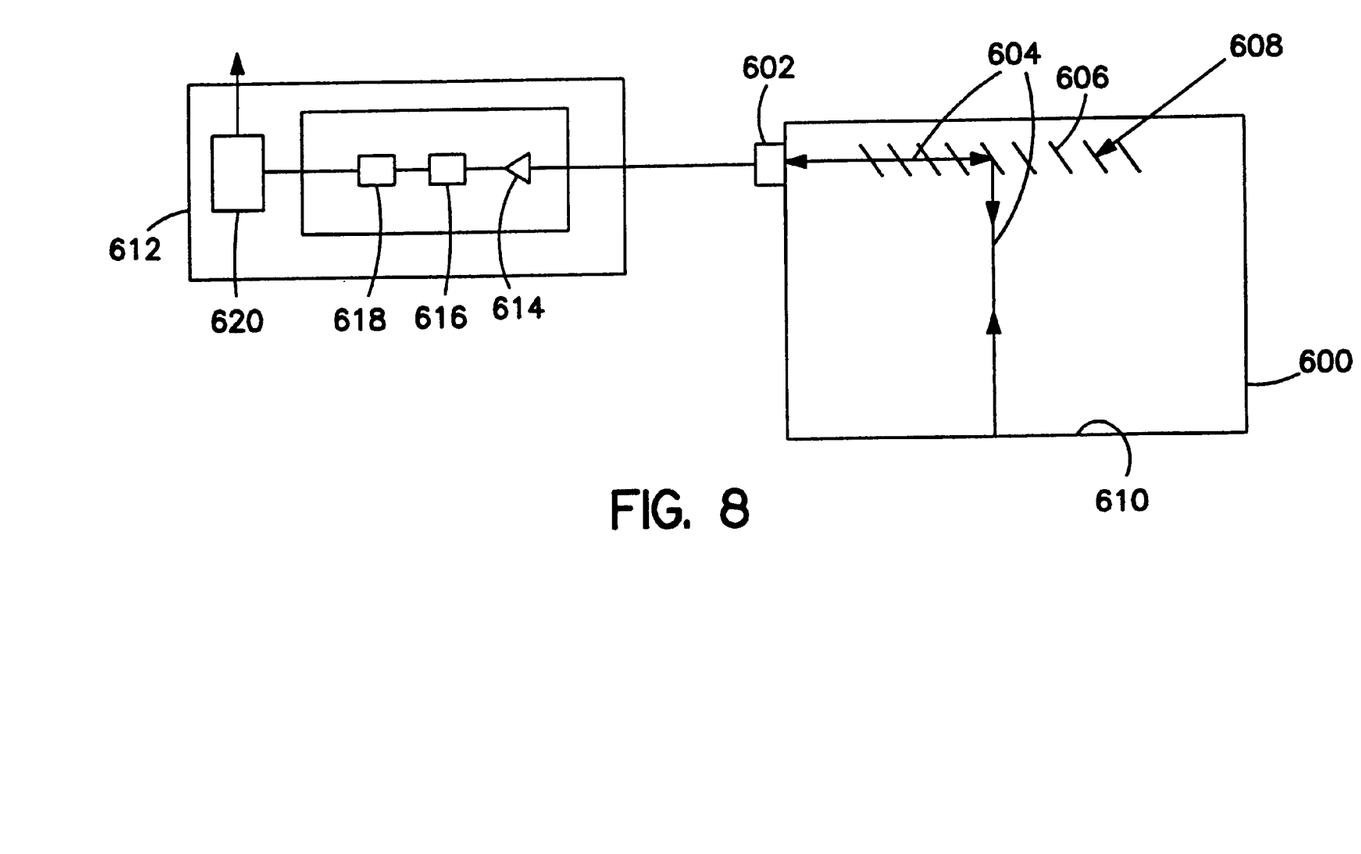
FIG. 8 illustrates an analysis circuit used for implementing an alternative embodiment of a controller of the present invention.

FIG. 8 illustrates the manner in which this embodiment may be implemented. FIG. 8 illustrates a plate 600 serving as the medium through which the acoustic signals travel. In this embodiment, the plate is glass, however alternate materials may be used. Attached to the plate 600 is a transducer 602. The transducer 602 generates and transmits an acoustic signal, represented by line 604, into the plate 600. The signal travels along the plate 600 intersecting a reflective array 606. The reflective array 606 includes a plurality of individual, partially reflective elements 608. Each reflective element 608 reflects a portion of the acoustic signal 90° to the incoming signal and passes a portion of the signal to the next reflective element. The reflected signal transverses the plate and impinges a sidewall 610 of the plate 600 having a reflective material attached thereto. The acoustic signal is reflected back across the plate 600 toward the reflective array 606. Upon hitting the reflective array 606 the acoustic signal is reflected back towards the transducer 602 until it is received by the transducer 602. Depending upon the materials used to form the glass, the manufacture of the reflective array and/or various other manufacturing variables for the touch sensor plate the signal received by the transducer will vary.

During the production and quality testing process of the touch sensors, the transducer 602 is electrically coupled to a signal analysis component 612. The signal analysis component 612 includes an amplifier 614 which receives the acoustic signal from the transducer 602, an analog-to-digital converter (ADC) 616 and a processor 618. The amplifier 614 receives the acoustic signal from the transducer 602, amplifies the signal and outputs the amplified signal to the ADC 616. The ADC 616 converts the analog, amplified acoustic signal to a digital representation thereof signifying a signal value. The digital signal is output to the processor 618. The processor 618 compares the digital signal to a preestablished value in the same manner as described above. Depending upon the relationship of the digital signal to the preestablished value, the processor 618 determines a gain adjustment value for a particular time-based point of the acoustic signal and stores the gain adjustment value in a memory 620. Each time the gain of the amplifier requires adjustment in order to maintain a preferred acoustic signal level to be maintained during touch monitoring operation, the processor 618 establishes and stores another gain adjustment value. Once the entire acoustic signal has been processed, a series of gain adjustment values will be stored in the memory 620.

By way of example, during testing of a glass plate 600 the transducer 602 transmits an acoustic signal into the plate 600 and receives a return signal. The return signal looks, for example, like the signal illustrated in FIG. 7A. The signal has a known duration equaling the periods delineated by the letters A, B, and C. Of particular interest is the portion of the signal occurring during period B, which also has known duration. This signal will repeat, virtually identically, every time a pulse acoustic signal is received by the transducer, as long as no touch has occurred on the touch screen. The signal of FIG. 7A is fed to the amplifier 614, digitized by the ADC 616 and then analyzed by the processor 618. The processor analyzes portions or segments of the signal one at a time. The processor compares the digital signal for a first segment of the acoustic signal to a preestablished value, stored for example in a processor memory element. Depending upon a difference between the signal value and the preestablished value the processor will generate a gain adjustment value to level the signal. In other words, the gain adjustment values can be used to adjust an amplifier upon receipt of subsequent acoustic signals in order to keep the acoustic signal within a preferred operating range of the process circuit components.

Once all of the segments of the acoustic signal are analyzed and the series of gain adjustment values is established for a particular plate, the values can be transferred to a controller accompanying the touch system into the marketplace.

Figure 9:
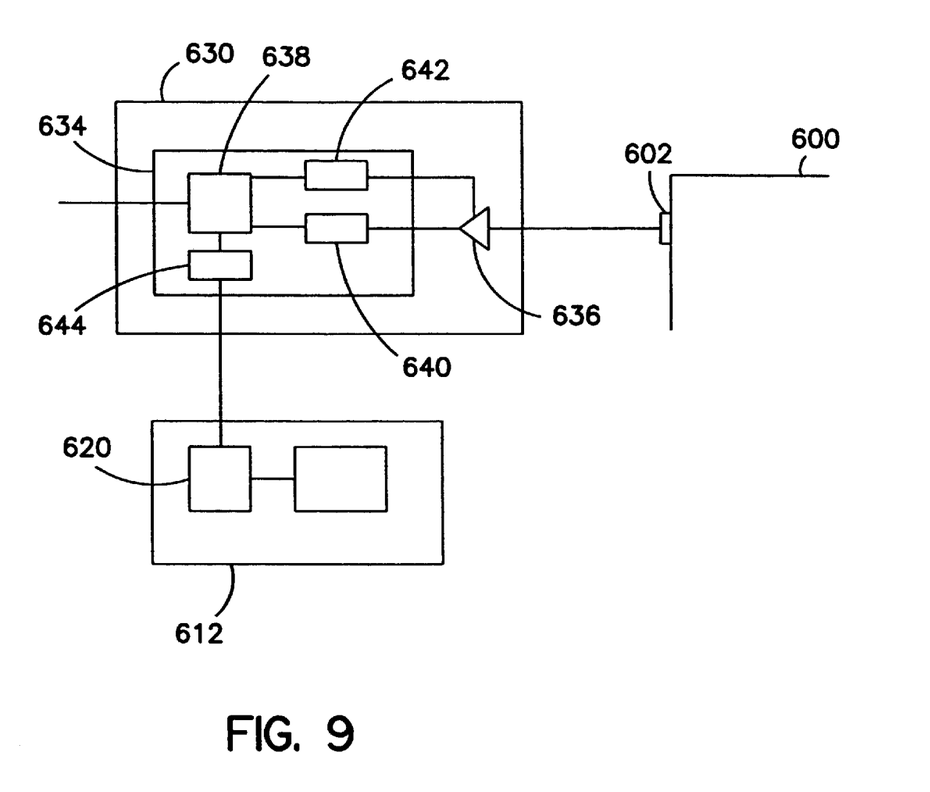
FIG. 9 is an alternate embodiment of a controller of the present invention.

As illustrated in FIG. 9, a controller 630 is coupled to a touch sensor 632. In this embodiment, the controller 630 includes a control circuit 634 and an adjustable gain amplifier 636. The control circuit 634 includes a processor 638, a ADC 640, a digital-to-analog converter (DAC) 642 and a memory element 644. Prior to shipment, the controller 630 is coupled to the signal analysis component 612 wherein the series of gain adjustment values is transferred from the signal analysis component memory 620 to the controller memory 644. Thereafter, the controller 630 and the signal analysis component 612 are disconnected and the touch sensor system is put into the marketplace. During operation of the touch sensor system, an acoustic signal is received by the transducer 602 and passed to the amplifier 636. Once the controller 630 begins receiving the acoustic signals from the transducer, the processor 638 uses the gain adjustment values in the memory 644 to predict the changes in the acoustic signal and adjust the gain of the amplifier 636 accordingly. Therein, while the envelope shape of the acoustic signal at the input of the amplifier 636 will resemble FIG. 7A the envelope shape of the acoustic signal at the output of the amplifier 636 will resemble FIG. 7B. In essence, the controller 630 anticipates changes in the acoustic signal due to the acoustic properties of the touch sensor.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A touch sensor system for a touch responsive computer interface, comprising:
    a touch sensor including a transducer for receiving an acoustic signal and converting the received acoustic signal into an electrical, touch signal having a duration, the transducer including an acoustic signal output and a touch signal output;
    an adjustable gain amplifier for amplifying the touch signal, the amplifier including a touch signal input coupled to the transducer touch signal output, a gain control input and an amplified signal output; and
    a controller including an amplified signal input coupled to the amplifier amplified signal output and a gain control output coupled to the amplifier gain control input, the controller configured for determining a level of the amplified touch signal and generating and outputting an amplifier gain control signal for adjusting the amplifier gain during the touch signal duration if the amplified touch signal does not meet preselected parameters.

2. A control circuit for a touch sensor system, comprising:
    an adjustable gain amplifier for receiving and amplifying a signal having a duration, the amplifier including a gain control input and an amplified signal output; and
    a microcontroller including an amplified signal input coupled to the amplifier amplified signal output and a gain control output coupled to the amplifier gain control input, the controller configured for determining a level of the amplified touch signal and generating and outputting an amplifier gain control signal for adjusting the amplifier gain during the signal duration if the amplified touch signal does not meet preselected parameters.

3. A dynamic gain controller, comprising:

a processor;

a memory element coupled to the processor;

an amplified signal input coupled to the processor for receiving an amplified input signal, the amplified input signal having a duration; and a control signal output coupled to the processor for supplying a gain control signal to an adjustable amplifier;

the memory element including computer code for instructing the processor to determine a level of the amplified signal and generate and output an amplifier gain control signal for adjusting an amplifier gain during the input signal duration if the amplified signal does not meet preselected parameters.

4. A control circuit for a touch sensor system, comprising:

an adjustable gain amplifier for receiving and amplifying a signal having a duration, the amplifier including a gain control input and an amplified signal output; and a microcontroller including an amplified signal input coupled to the amplifier amplified signal output and a gain control output coupled to the amplifier gain control input, the controller configured for generating and outputting an adjusted amplifier gain control signal for adjusting the amplifier gain during the signal duration based upon a set of predetermined gain correction values.

5. A control circuit for a touch sensor system, comprising:

a processor;

a memory element coupled to the processor;

an amplified signal input coupled to the processor for receiving an amplified input signal, the amplified input signal having a duration; and a control signal output coupled to the processor for supplying a gain control signal to an adjustable amplifier;

the memory element including a parameters database including predetermined gain correction values and computer code for instructing the processor to generate and output an adjusted amplifier gain control signal for adjusting an amplifier gain during the input signal duration based upon the predetermined gain correction values.

* * * * *